United States Patent
Hayashibara et al.

(10) Patent No.: US 7,403,699 B2
(45) Date of Patent: Jul. 22, 2008

(54) OPTICAL DISC APPARATUS (75) Inventors: Kazuki Hayashibara, Daito (JP); Kayo Teramoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 890 days.

(21) Appl. No.: 10/757,472

(22) Filed: Jan. 15, 2004

(65) Prior Publication Data

US 2004/0146286 A1 Jul. 29, 2004

(30) Foreign Application Priority Data

Jan. 15, 2003 (JP) .............................. 2003-006665

(51) Int. Cl.
*H04N 5/781* (2006.01)
(52) U.S. Cl. .......................... 386/126; 386/96; 386/98; 386/104; 386/106; 386/125
(58) Field of Classification Search ......... 386/111–112, 386/125–126, 94, 52, 45, 96, 97, 98, 99, 386/104–106

See application file for complete search history.

(56) References Cited

U.S. PATENT DOCUMENTS

| | | | | |
|---|---|---|---|---|
| 6,396,998 | B1 * | 5/2002 | Nozaki et al. | 386/52 |
| 7,263,275 | B2 * | 8/2007 | Demas et al. | 386/68 |
| 2004/0120345 | A1 * | 6/2004 | Yamaguchi et al. | 370/465 |
| 2006/0159434 | A1 * | 7/2006 | Hayashibara | 386/126 |
| 2007/0160350 | A1 * | 7/2007 | Ikeda et al. | 386/99 |
| 2007/0168601 | A1 * | 7/2007 | Plourde, Jr. | 711/112 |

FOREIGN PATENT DOCUMENTS

| | | |
|---|---|---|
| JP | 08-287616 | 11/1996 |
| JP | 10-106167 | 4/1998 |
| JP | 10-125003 | 5/1998 |
| JP | 11-500254 | 1/1999 |
| JP | 11-096653 | 4/1999 |
| JP | 11-266432 | 9/1999 |
| JP | 2000-123486 | 4/2000 |
| JP | 2000-222826 | 8/2000 |
| JP | 2000-293951 | 10/2000 |
| JP | 2001-126377 | 5/2001 |
| JP | 2001-250318 | 9/2001 |
| JP | 2001-344906 | 12/2001 |
| WO | WO 97/14149 | 4/1997 |

* cited by examiner

*Primary Examiner*—Thai Tran
*Assistant Examiner*—Helen Shibru
(74) *Attorney, Agent, or Firm*—Crowell & Moring LLP (57) ABSTRACT

At the time of stopping the first reproduction process, a main controller makes a RAM store audio identification information corresponding to the kind of audio having been reproduced in the preceding reproduction process. At the time of restarting reproduction process, the main controller so controls a demultiplexer as to extract, from the compressed audio data read out by the optical pickup, compressed audio data having the same audio identification information that the RAM stores. Subsequently, the main controller so controls the demultiplexer as to send the extracted compressed audio data to the audio decoder.

Thus, in a DVD player which is absent of a DTS audio reproduction function or output function, compressed data of DTS audio can be prevented from being sent to an audio decoder, thereby the DVD player can be prevented from becoming unable to output audio.

3 Claims, 5 Drawing Sheets

| KIND OF COMPRESSED AUDIO DATA | AUDIO IDENTIFICATION INFORMATION | |
|---|---|---|
| | STREAM ID | UPPER 5 BITS OF SUBSTREAM ID |
| LPCM | 10111101 | 10100 |
| DOLBY DIGITAL | 10111101 | 10000 |
| MPEG AUDIO | 11000*** OR 11010*** | NONE |
| DTS | 10111101 | 10001 |

OPTICAL DISC APPARATUS

BACKGROUND OF THE INVENTION

1. Field of the Invention

The present invention relates to an optical disc apparatus for reading out and reproducing information, such as audio and video, recorded on an optical disc such as DVD (Digital Versatile Disc). It more particularly relates to an optical disc apparatus which does not have, i.e. is absent of, a function of reproducing or outputting DTS (Digital Theater System) audio.

2. Description of the Related Art

Conventionally, optical discs such as DVD-ROM (DVD-Read Only Memory) with so-called multiplex audio streams are known, in which various compressed audio data, such as LPCM (Linear Pulse Code Modulation), Dolby Digital, MPEG (Moving Picture Coding Experts Group) audio and DTS, are recorded. In such kinds of optical discs, there is an increasing trend that a DTS audio is recorded in the first stream. On the other hand, some optical disc apparatus for reproducing information such as audio recorded on an optical disc do not have, in audio decoders thereof, any decoder for reproducing DTS audio (such decoder being hereinafter referred to as DTS decoder). Some other optical disc apparatus are so designed as to output no DTS audio because no patent license fees are paid for DTS decoders.

Such optical disc apparatus, which do not have, i.e. are absent of, a DTS audio reproduction function or DTS audio output function, are usually so designed that a user cannot select DTS audio reproduction. Furthermore, such optical disc apparatus are usually so set at the initial setting for factory shipment that other audio than the DTS audio is automatically selected at the first reproduction in use after a power supply is switched on. Accordingly, no compressed data of DTS audio is sent to an audio decoder, thereby preventing such state that no audio is output from an audio output terminal, i.e. preventing the optical disc apparatus from becoming unable to output audio from an audio output terminal.

Some of such kinds of optical disc apparatus, in which a priority language is set at the initial setting, are so designed that if compressed audio data of the priority language is recorded on the optical disc, audio is reproduced and output in accordance with the compressed audio data.

Japanese Laid-open Patent Publication Hei 10-125003 discloses an optical disc apparatus that uses a stream ID (identifier) and a substream ID for dividing various compressed data in order to handle auxiliary video data and various audio data in addition to MPEG video data.

Furthermore, Japanese Laid-open Patent Publication 2000-222826 discloses an optical disc apparatus that sets a signal amplifier circuit at mute state even in the case where the expanded signal from the compressed audio signal shows silence, thereby preventing the signal amplifier circuit from outputting noise, for the purpose of obtaining better S/N ratio when D/A converting compressed audio signals.

Further, in the field of audio reproduction apparatus having no multi-channel reproduction function and having only a stereo two-channel reproduction function, there is a case where audio recorded on an optical disc for reproduction comprises only a multi-channel signal without any coefficients for downmixing the multi-channel signal to a stereo two-channel signal. Japanese Laid-open Patent Publication 2001-344906 discloses an optical disc apparatus that, in the above case, downmixes the multi-channel signal to a stereo two-channel signal in accordance with downmix coefficients recorded on a ROM in the audio reproduction apparatus, in order to prevent the occurrence of a state such that no audio is output, i.e. prevent the optical disc apparatus from becoming unable to output audio.

Furthermore, in the field of audio transmitters and audio receivers, it may occur that when transmitted audio streams change in the kind, the starting or ending portion of audio reproduced at the receiver side cuts out. For the purpose of preventing such occurrence, when transmitted audio streams change in the kind, an audio transmitter disclosed in Japanese Laid-open Patent Publication 2001-250318 outputs, for a given time, a packet containing a silence identifier and an identifier information prior to the change together with a packet containing a silence identifier and an identifier information after the change.

According to the conventional optical disc reproduction apparatus as described above, which do not have, i.e. are absent of, a DTS audio reproduction function or DTS audio output function, the initial setting is made such that other audio than the DTS audio is automatically selected at the time of reproduction. However, when a user stops the reproduction process, the initial setting is canceled. Accordingly, in the case where the user once stops the reproduction process, and then restarts the reproduction without selecting the kind of audio, there is a possibility that a compressed data of DTS audio recorded in the first stream on the optical disc is sent to an audio decoder, whereby such state may occur that no audio is output from the audio output terminal. Such problem cannot be solved in the case of the above-described method of reproducing, with priority, compressed audio data of a priority language. Furthermore, such problem cannot be solved by any technologies according to the above-described four references.

SUMMARY OF THE INVENTION

An object of the present invention is to provide such an optical disc apparatus, not having, i.e. being absent of, a DTS audio reproduction function or DTS audio output function, that a compressed data of DTS audio is not sent to an audio decoder, thereby preventing such state that no audio is output from an audio output terminal, i.e. preventing the optical disc apparatus from becoming unable to output audio from an audio output terminal thereof.

An optical disc apparatus in accordance with an aspect of the present invention comprises: an optical pickup for reading out compressed data, including compressed video data and compressed audio data, recorded in a recorded area of an optical disc; a memory for storing a table of identification information for identifying kinds of the compressed data read out by the optical pickup; a demultiplexer for demultiplexing the compressed data, including compressed video data and compressed audio data, read out by the optical pickup into assorted kinds of data in accordance with the identification information stored in the memory; a video decoder for decoding the compressed video data demultiplexed by the demultiplexer; an audio decoder for decoding the compressed audio data demultiplexed by the demultiplexer; an output terminal for outputting the video data decoded by the video decoder and the audio data decoded by the audio decoder; and a main controller for controlling the optical pickup, the memory, the demultiplexer, the video decoder, the audio decoder and the output terminal.

The table of the identification information stored in the memory contains audio identification information for identifying kinds of compressed audio data.

The audio decoder comprises plural kinds of audio decoders for respectively decoding plural kinds of compressed audio data read out by the optical pickup.

Selection out of the audio decoders is performed in a manner that the audio identification information contained in the compressed audio data which is read out by the optical pickup is compared with the audio identification information in the table of the identification information stored in the memory, thereby the kind of the compressed audio data read out by the optical pickup is discriminated, and one of the audio decoders is selected in accordance with the thus discriminated kind of compressed audio data.

The audio decoder is absent of a DTS audio decoding function or DTS audio output function.

The main controller performs such control that, in restarting a decoding process, compressed data of DTS audio is prevented from being sent to the audio decoder, thereby preventing the optical disc apparatus from becoming unable to output audio data from the output terminal.

According to the above-described configuration of optical disc apparatus which is absent of a DTS decoder, reproduction of DTS audio is prevented in the first reproduction process after a power supply is switched on. Accordingly, when the first reproduction process stops, the memory means stores audio identification information corresponding to audio of a kind other than the DTS audio. In restarting a reproduction process, the demultiplexer is controlled by the main controller to extract, from the compressed audio data read out by the optical pickup, compressed audio data of the kind which corresponds to the audio identification information stored in the memory and which is other than the DTS audio. The demultiplexer is also controlled by the main controller to send the extracted compressed audio data to the audio decoder. Thus, compressed data of DTS audio is prevented from being sent to the audio decoder, thereby preventing the optical disc apparatus from becoming unable to output audio data from the output terminal.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE EMBODIMENT

Embodiments of the present invention will be described hereinafter with reference to the drawings.

Figure 1:
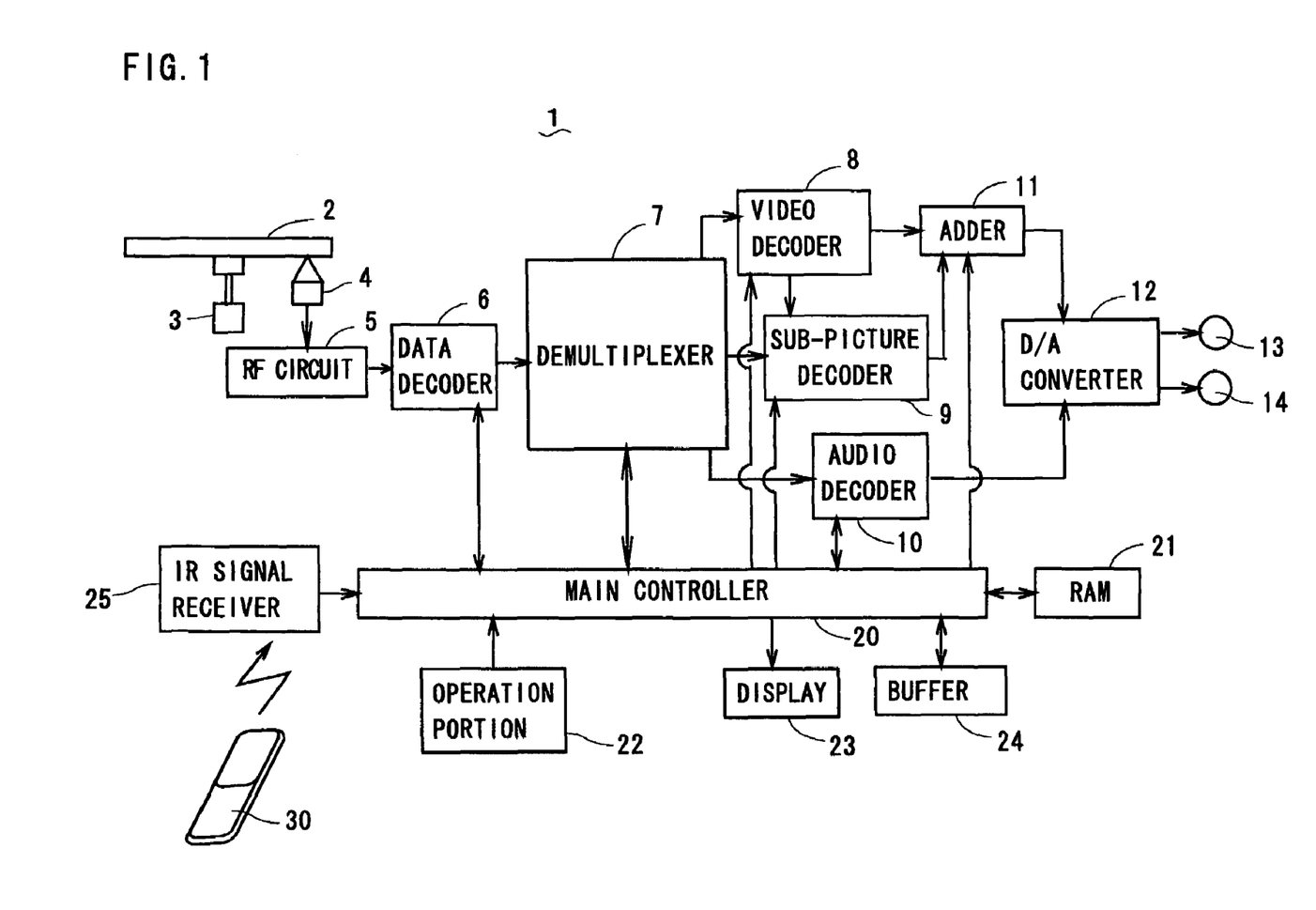
FIG. 1 is a schematic electrical block diagram of an optical disc apparatus according to an embodiment of the present invention.

FIG. 1 is a schematic electrical block diagram of a DVD player (optical disc apparatus) according to an embodiment of the present invention. This DVD player 1 is an apparatus for reading out compressed data of video, audio and so on recorded on a DVD (Digital Versatile Disc) 2, reproducing video, audio and so on, and outputting the reproduced video, audio and so on. The DVD player 1 belongs to a type which does not have, i.e. is absent of, a decoder for reproducing DTS (Digital Theater System) audio.

The DVD player 1 comprises: a spindle motor 3 for rotating the DVD 2 mounted on a tray; an optical pickup 4 for outputting, in the form of RF signals, information recorded on the DVD 2; an RF circuit 5 to process the RF signals, e.g. binarize the RF signals, output from the optical pickup 4; and a data decoder 6 for subjecting the data processed by the RF circuit 5 to a decoding process such as data modulation and error correction. The DVD player 1 further comprises: a demultiplexer 7 for dividing the data, having been subjected to the decoding process by the data decoder 6, into compressed main video data, compressed auxiliary video data and various compressed audio data; a video decoder 8 for decoding the compressed main video data; a sub-picture decoder 9 for decoding the compressed auxiliary video data to reproduce, e.g., captions; and an audio decoder 10 for decoding various compressed audio data.

Referring to FIG. 1, an adder 11 combines the main video sent from the video decoder 8 with the auxiliary video, such as captions, sent from the sub-picture decoder 9. Further, a D/A converter 12 converts the video data, combined by the adder 11, and the audio data, decoded by the audio decoder 10, to analog signals. The video signals and the audio signals sent from the D/A converter 12 are output from a video output terminal 13 and an audio output terminal 14 respectively. These output terminals correspond to the output means in the claims.

The DVD player 1, furthermore, comprises a main controller 20 for controlling the entire apparatus, and a remote control 30 to send a reproduction command, a stop command and other commands to, and set various settings of, the main body of the apparatus. The main controller 20 is connected to the above-described spindle motor 3, RF circuit 5, data decoder 6, demultiplexer 7, video decoder 8, sub-picture decoder 9, audio decoder 10 and adder 11. The main controller 20 is further connected to a RAM 21 storing various data such as many sorts of setting data, an operation portion 22 for giving various commands to the apparatus, a display 23 for displaying various messages, a buffer 24 for temporarily storing data such as resume information, and an IR (infrared ray) signal receiver 25 for receiving infrared ray signals sent from the remote control 30.

Figure 2:
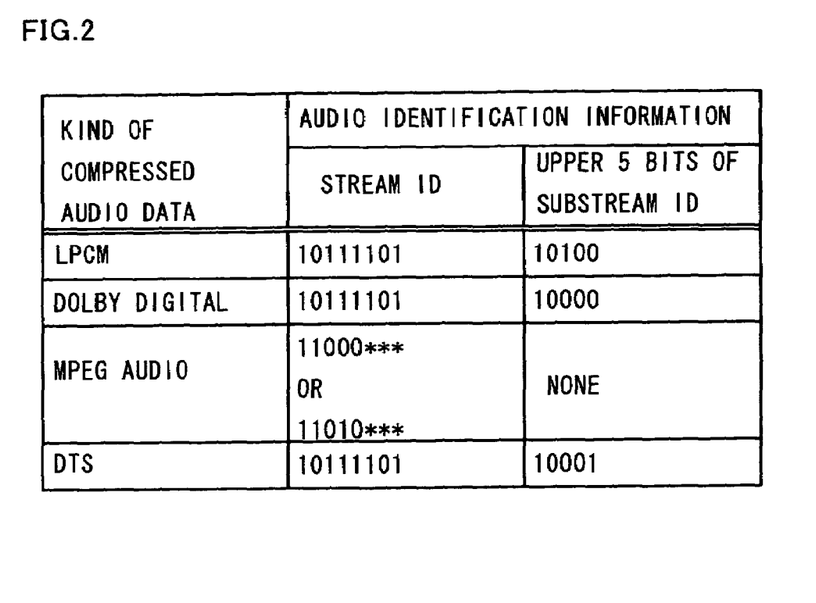
FIG. 2 is a table showing contents of identification information, for compressed audio data, stored in a RAM in the above-described reproduction apparatus.

The RAM 21 stores a table of identification information for the compressed main video data, the compressed auxiliary video data and the various compressed audio data. Among them, the identification information for the compressed audio data is composed of the stream ID and upper 5 bits of the substream ID, as shown in the table of FIG. 2. The table stores identification information for LPCM (Linear Pulse Code Modulation), Dolby Digital and MPEG (Moving Picture Coding Experts Group) audio as well as identification information for DTS (Digital Theater System).

When commanded by a user to start reproduction, the main controller 20 reads out the identification information in the table from the RAM 21 and transfers the identification information to the demultiplexer 7. The main controller 20 also transfers, to the demultiplexer 7, identification information for a certain kind of compressed audio data selected on predetermined conditions. The demultiplexer 7 divides, in accordance with the identification information, the compressed data sent from the data decoder 6 into the compressed main video data, the compressed auxiliary video data and the compressed audio data. The demultiplexer 7 also extracts, from the compressed audio data, compressed audio data having the above-described identification information of the certain kind. The demultiplexer 7 further sends the thus divided compressed main video data and the compressed auxiliary video data to the video decoder 8 and the sub-picture decoder 9, respectively, and also sends the extracted compressed audio data to the audio decoder 10.

Figure 3:
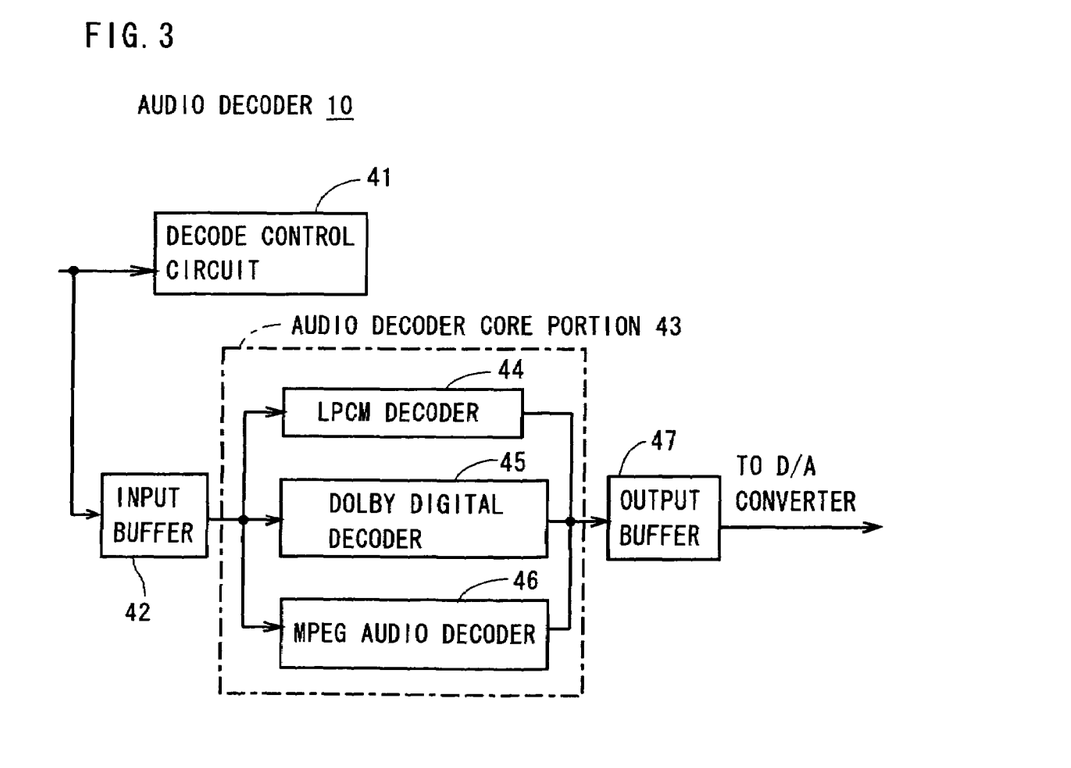
FIG. 3 is a block diagram showing a detailed structure of an audio decoder in the above-described reproduction apparatus.

FIG. 3, shows a detailed structure of the audio decoder 10 in the above-described DVD player 1 shown in FIG. 1. The audio decoder 10 comprises: a decode control circuit 41 for controlling entire operation of the audio decoder 10, using additional data contained in the compressed audio data sent from the demultiplexer 7; an input buffer 42 for temporarily storing the compressed audio data sent from the demultiplexer 7; an audio decoder core portion 43 for reproducing audio in accordance with the compressed audio data sent from the input buffer 42; and an output buffer 47 for temporarily storing audio data in digital form to be output to the D/A converter 12.

The audio decoder core portion 43 comprises an LPCM decoder 44, a Dolby Digital decoder 45 and an MPEG audio decoder 46. With reference to the stream ID (see No. 56 in FIG. 4) and the upper 5 bits of the substream ID (see No. 53 in FIG. 4) that are contained in the compressed audio data sent from the demultiplexer 7, the audio decoder core portion 43 discriminates the kind of the thus sent compressed audio data, and selects one of the audio decoders, to be used, in accordance with the discriminated kind of the compressed data. Using the selected audio decoder, the compressed audio data sent from the input buffer 42 is expanded and decoded.

Next, referring to FIG. 4, the stream ID and the substream ID in the above-described compressed audio data will be described.

Figure 4:
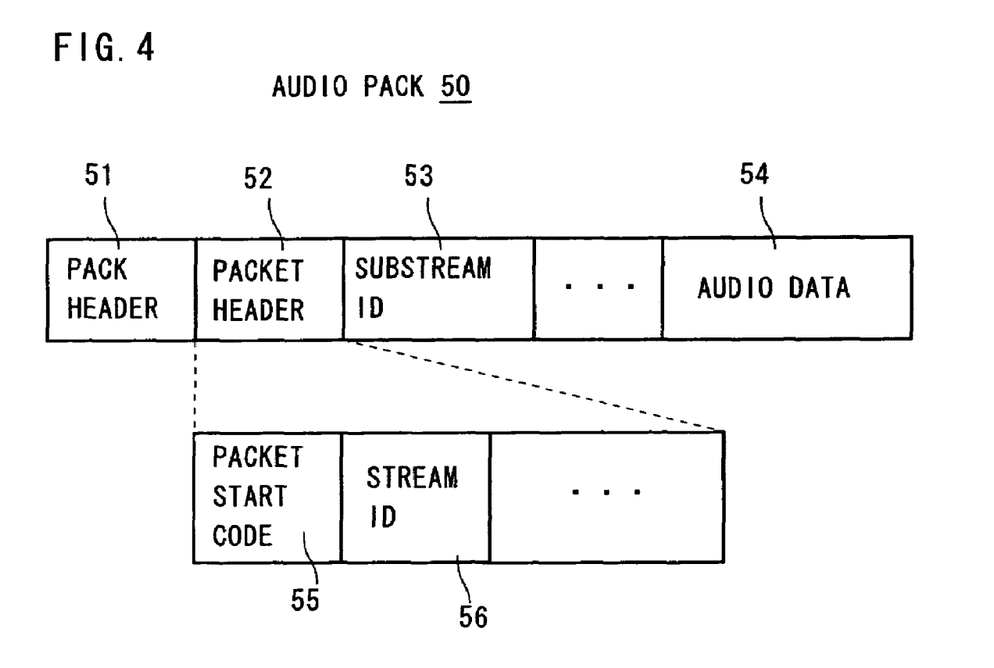
FIG. 4 is a schematic diagram showing a record format of an audio pack in a DVD to be read out by the above-described reproduction apparatus.

FIG. 4 shows a record format of an audio pack in the DVD 2. The compressed audio data sent from the data decoder 6 to the demultiplexer 7 is composed of either one audio pack 50 or a plurality of such audio packs 50 that are connected to each other. As shown in FIG. 4, the audio pack 50 contains a pack header 51, a packet header 52, a substream ID 53 and an audio data 54. The pack header 51 contains a pack start code, a standard reference value of system clock and so on. Further, as shown in FIG. 4, the packet header 52 contains a packet start code 55 and a stream ID 56.

The compressed audio data sent from the data decoder 6 to the demultiplexer 7 contains the stream ID 56 and the substream ID 53. With reference to the stream ID 56 and the upper 5 bits of the substream ID 53, the demultiplexer 7 extracts a certain kind of compressed audio data from a plurality of compressed audio data, and sends the extracted compressed audio data to the audio decoder 10.

Figure 5:
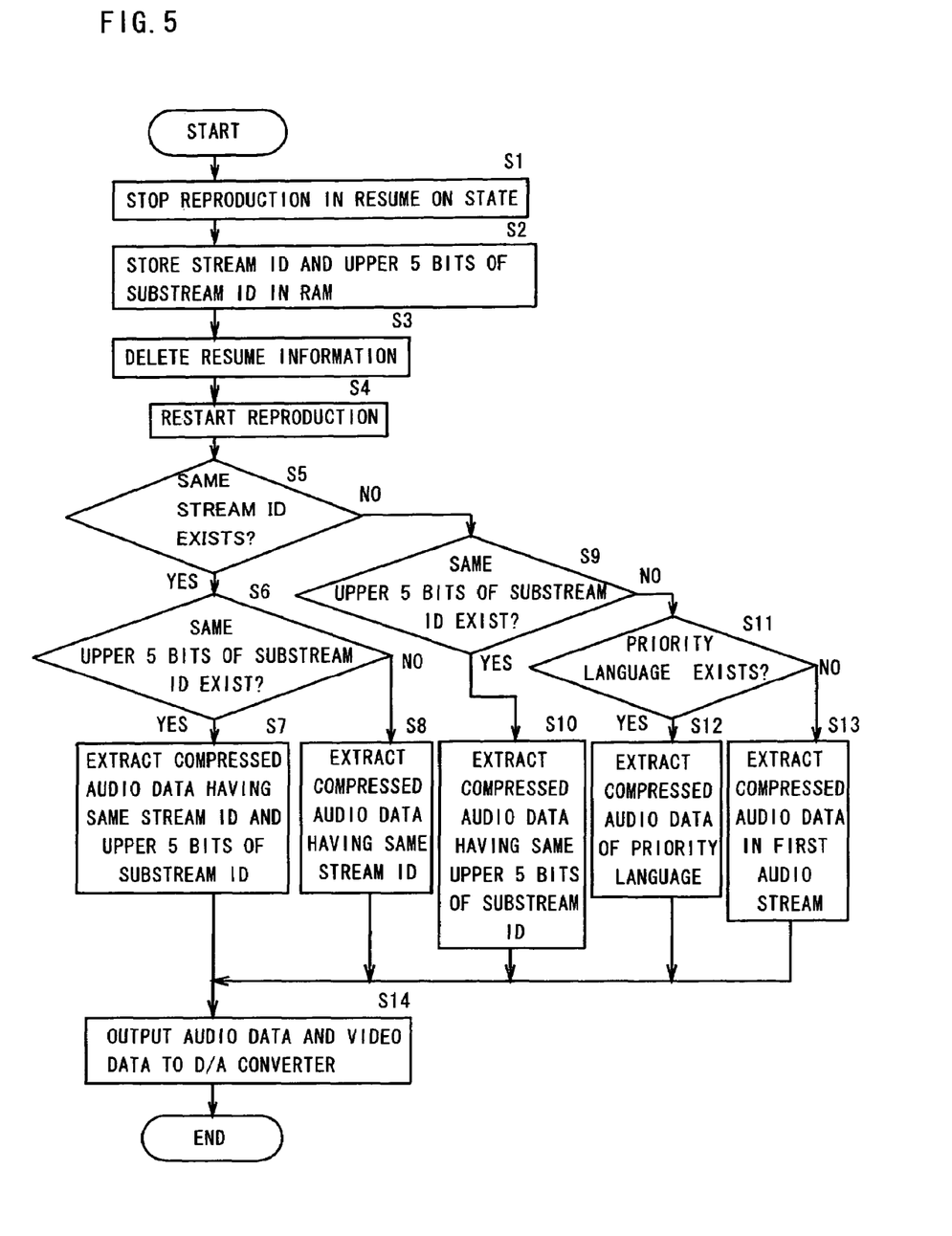
FIG. 5 is a flowchart showing a process in the above-described reproduction apparatus in the case where the reproduction process is restarted with a resume function being in the ON-state.

Hereinafter, referring to a flowchart of FIG. 5 as well as FIG. 1 to FIG. 4, description will be made as to a process performed by the DVD player 1 in the case where a reproduction process is restarted with a resume function being in the ON-state. Here, the resume function means such function as: to record, in the buffer 24 (refer to FIG. 1), resume information including a stop position (resume point) of each of the main video, auxiliary video and audio being reproduced at the time of stopping the preceding reproduction process; and to restart, at the time of restarting the reproduction process, the reproduction process of each of the main video, auxiliary video and audio from the resume point recorded in the buffer 24.

When a user stops a reproduction process by, e.g., the remote control 30 with the resume function being in the ON-state (S1), the main controller 20 reads, from the resume information file in the buffer 24, the stream ID 56 and the upper 5 bits of the substream ID 53 that are contained in the compressed audio data being reproduced at the time of stopping the reproduction process. The main controller 20 makes the RAM 21 store the thus read stream ID 56 and upper 5 bits of the substream ID 53 (S2). In the case of the DVD player 1, which is an optical disc apparatus not having, i.e. being absent of, a DTS decoder, it is prevented that any compressed data of DTS audio is reproduced at the first reproduction process after a power supply is switched on. Accordingly, the main controller 20 stores, in the RAM 21, the stream ID 56 and the upper 5 bits of the substream ID 53 corresponding to the compressed audio data of a kind other than the DTS audio at the time of stopping the first reproduction process.

After the process described in S2 above, the main controller 20 reads the resume point contained in the resume information file in the buffer 24, and sets the resume point as a read-out restarting position of the optical pickup 4 at the time of restarting reproduction. Thereafter, the main controller 20 deletes the resume information file from the buffer 24, whereby the resume function is shifted to the OFF-state (S3). The main controller 20 then restarts, from the above-described read-out restarting position, the read-out process by the optical pickup 4 for reading information on the DVD 2 and also restarts the reproduction process of the information (S4).

After the reproduction process is restarted, the main controller 20 checks whether or not, in the compressed audio data output from the data decoder 6, there exists compressed audio data having the same stream ID 56 that the RAM 21 stored in the above process of S2 (S5). In the case where there exists compressed audio data having the same stream ID 56 (Yes in S5), the main controller 20 checks whether or not, in the compressed audio data output from the data decoder 6, there exists compressed audio data having a substream ID 53, the upper 5 bits of which are the same as the upper 5 bits of the substream ID 53 stored in the RAM 21 in the above process of S2 (S6). As a result, in the case where there exists compressed audio data having the same upper 5 bits of the substream ID 53 (Yes in S6), the main controller 20 sends, to the demultiplexer 7, the stream ID 56 and the upper 5 bits of the substream ID 53 that are stored in the RAM 21 in the above process of S2. Then, the main controller 20 so controls the demultiplexer 7 as to extract the compressed audio data having the thus sent stream ID 56 and upper 5 bits of the substream ID 53 (S7).

The stream ID 56 and the upper 5 bits of the substream ID 53 stored in the RAM 21 in the above process of S2 constitute identification information corresponding to compressed audio data other than DTS audio. Accordingly, by so controlling the demultiplexer 7 as to extract compressed audio data having the same identification information as the thus obtained identification information as described in the above-described S7, it becomes possible that no compressed data of DTS audio is sent to the audio decoder 10, i.e. that compressed data of DTS audio is prevented from being sent to the audio decoder 10. Thereby, it becomes possible to prevent such state that no audio is output from the output terminal 14, i.e. that the optical disc apparatus is prevented from becoming unable to output audio from the output terminal.

In the case where there exists no compressed audio data having the same upper 5 bits of the substream ID 53 as a result of the checking in the above-described S6 (No in S6), the main controller 20 sends the stream ID 56 stored in the RAM 21 in the above process of S2 to the demultiplexer 7, and so controls the demultiplexer 7 as to extract compressed audio data having the same stream ID 56 as the thus sent stream ID 56 (S8).

Furthermore, in the case where there exists no compressed audio data having the same stream ID 56 as a result of the checking in the above-described S5 (No in S5), the main controller 20 checks whether or not, in the compressed audio data output from the data decoder 6, there exists compressed audio data having a substream ID 53, the upper 5 bits of which are the same as the upper 5 bits of the substream ID 53 stored in the RAM 21 in the above process of S2 (S9). As a result, in the case where there exists compressed audio data having the same upper 5 bits of the substream ID 53 (Yes in S9), the main controller 20 sends, to the demultiplexer 7, the upper 5 bits of the substream ID 53 stored in the RAM 21 in the above process of S2, and so controls the demultiplexer 7 to extract compressed audio data having the same code as the upper 5 bits of the thus sent substream ID 53 (S 10).

In the case where there exists no compressed audio data having the same 5 bits of the substream ID 53 as a result of the checking in the above-described S9 (No in S9), the main controller 20 checks whether or not, in the compressed audio data output from the decoder 6, there exists compressed audio data having the same identification information as that of a priority language stored in the RAM 21 at the time of initial setting (S11). As a result, in the case where there exists compressed audio data having the same identification information (Yes in S11), the main controller 20 sends, to the demultiplexer 7, the stream ID 56 and the upper 5 bits of the substream ID 53 of this compressed audio data. Then, the main controller 20 so controls the demultiplexer 7 as to extract compressed audio data having the same code as the thus sent stream ID 56 and upper 5 bits of the substream ID 53 (S12).

On the other hand, in the case where there exists no compressed audio data having the same identification information as that of the priority language as a result of the checking in the above S11 (No in S11), the main controller 20 sends, to the demultiplexer 7, the stream ID 56 and the upper 5 bits of the substream ID 53 in the first audio stream. Then, the main controller 20 so controls the demultiplexer 7 as to extract compressed audio data having the same code as the thus sent stream ID 56 and upper 5 bits of the substream ID 53 (S13).

Next, the main controller 20 sends, to the audio decoder 10, the compressed audio data extracted according to the processes of the above-described S5 to S13. Then, audio data reproduced by the audio decoder 10 and video data output from the adder 11 are output to the D/A converter 12 (S14). Based on these data, the D/A converter 12 generates analog signals of video and audio, and outputs them to the output terminals 13 and 14, respectively.

As described above, the same kind of audio as one reproduced in the preceding reproduction process is, with high probability, sent to the audio decoder 10 by the main controller 20. Thereby, compressed data of DTS audio can be most probably prevented from being sent to the audio decoder 10. Thus, it becomes least probable that no audio is output, i.e. audio is prevented from being output, from the output terminal 14.

In the following, description will be made as to a process performed by the DVD player 1 in the case where a reproduction process is restarted with the resume function being in the OFF-state. In the case where the resume function is in the OFF-state, being different from the case where the resume function is in the ON-state as shown in FIG. 5, the main controller 20 does not store, in the buffer 24, the stream ID 56 and the upper 5 bits of the substream ID 53 that are contained in compressed audio data being reproduced at the time of stopping the reproduction process. Accordingly, after the reproduction process is stopped, it is not possible to recognize the kind of compressed audio data being reproduced at the time of stopping the reproduction process. So, differently from the case where the resume function is in the ON-state, it is not possible to send, to the audio decoder 10, the same kind of compressed audio data as one decoded in the preceding reproduction process. For this reason, the main controller 20 performs such function that, when the resume function is in the OFF-state, compressed audio data other than DTS audio is extracted from the compressed audio data sent from the data decoder 6 to the demultiplexer 7, and is sent to the audio decoder 10, thereby preventing compressed data of DTS audio from being sent to the audio decoder 10.

Figure 6:
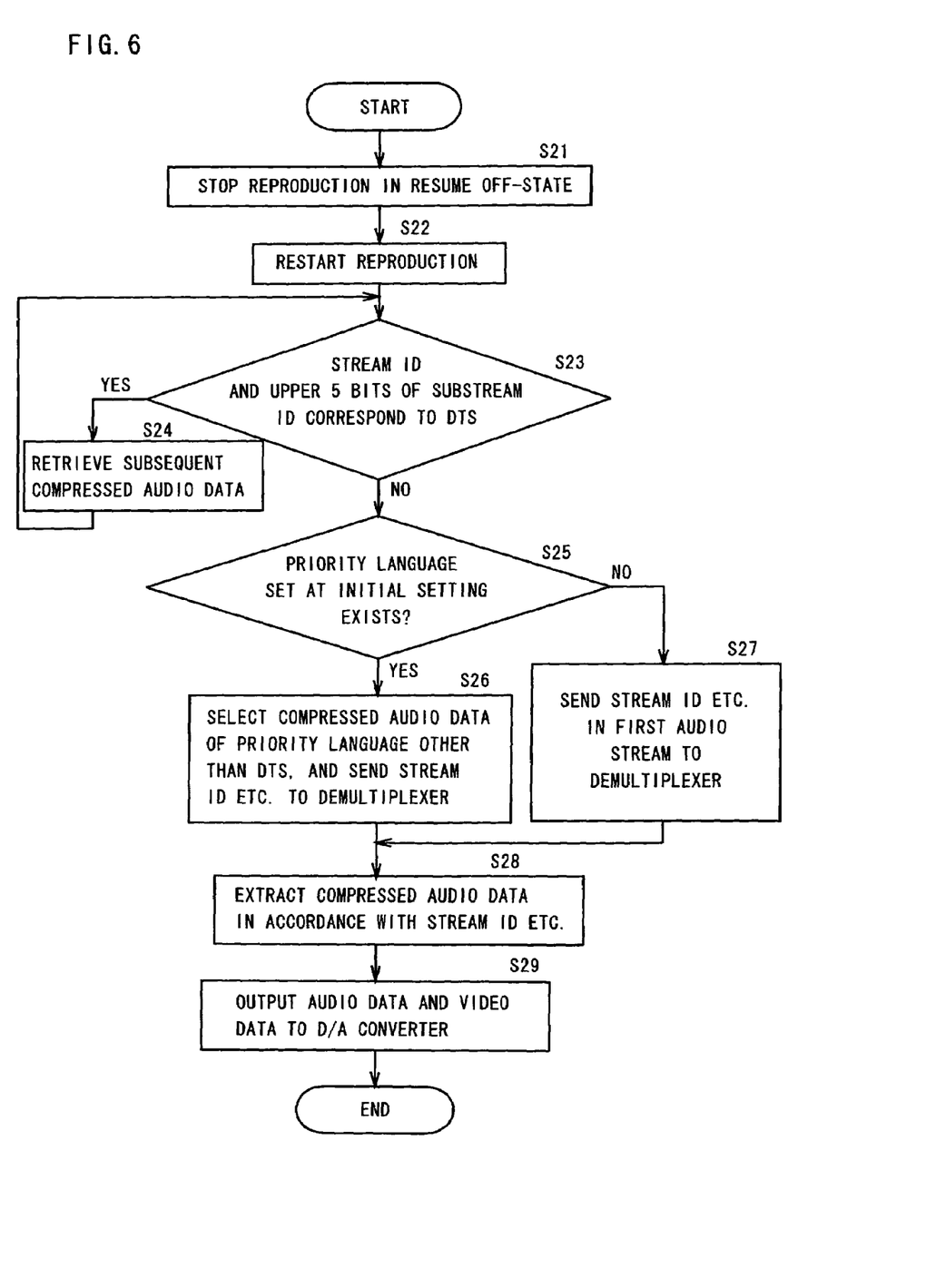
FIG. 6 is a flowchart showing a process in the above-described reproduction apparatus in the case where the reproduction process is restarted with the resume function being in the OFF-state.

Hereinafter, referring to a flowchart of FIG. 6 as well as FIG. 1 to FIG. 4, detailed description will be made as to a process performed by the DVD player 1 in the case where a reproduction process is restarted with a resume function being in the OFF-state.

When a user stops a reproduction process by, e.g., the remote control 30 with the resume function being in the OFF-state (S21), the main controller 20 reads, from the RAM 21, the table of identification information for the compressed audio data shown in FIG. 2. Thereafter, the main controller 20 restarts reading out information on the DVD 2 and reproducing the information (S22). The compressed data about main video, auxiliary video, audio and so on, stored in the DVD 2 are read out by the optical pickup 4 from the starting data in sequence. The main controller 20 checks whether or not the stream ID 56 and the upper 5 bits of the substream 53 that are contained in the thus read out compressed audio data are the same as a code of the DTS compressed audio data contained in the above-described table of identification information (S23).

In the case where they are the same as a result of the checking in the above S23 (Yes in S23), the main controller 20 retrieves a subsequent compressed audio data (S24), and again subjects the subsequent compressed audio data to the checking of the above S23. On the other hand, in the case where they are not the same (No in S23), the main controller 20 checks whether or not, in the compressed audio data, there exists compressed audio data having the same identification information as that of a priority language stored in the RAM 21 at the time of initial setting (S25).

As a result, in the case where there exists compressed audio data having the same identification information (Yes in S25), the main controller 20 sends, to the demultiplexer 7, the stream ID 56 and the upper 5 bits of the substream ID 53 of such compressed audio data (S26). Then, the main controller 20 so controls the demultiplexer 7 as to extract compressed audio data having the thus sent stream ID 56 and upper 5 bits of the substream ID 53 (S28).

On the other hand, in the case where there exists no compressed audio data having the same identification information of the priority language as a result of the checking in the above S25 (No in S25), the main controller 20 sends, to the demultiplexer 7, the stream ID 56 and the upper 5 bits of the substream ID 53 in the first audio stream (S27). Then, the main controller 20 so controls the demultiplexer 7 as to extract compressed audio data having the thus sent stream ID 56 and upper 5 bits of the substream ID 53 (S28).

Next, the main controller 20 sends, to the audio decoder 10, the compressed audio data extracted according to the processes of the above-described S23 to S27. Then, audio data reproduced by the audio decoder 10 and video data output from the adder 11 are output to the D/A converter 12 (S29). Based on these data, the D/A converter 12 generates analog signals of video and audio, and outputs them to the output terminals 13 and 14, respectively.

According to the DVD player 1 of the present embodiment as described above, the main controller 20 so controls the demultiplexer 7 as to extract, from the compressed audio data read out by the optical pickup 4, compressed audio data of kinds other than DTS audio, and to send the thus extracted compressed audio data to the audio decoder 10. Thereby, compressed data of DTS audio can be prevented from being sent to the audio decoder 10. Thus, it becomes possible to prevent such state that no audio is output from the output terminal 14, i.e. to prevent the DVD player 1 from becoming unable to output audio from an audio output terminal 14.

It is to be noted that the present invention is not limited to the above-described embodiment, and that various modifications thereof are possible. The above-described present embodiment illustrates the case where the present invention is applied to the DVD player 1, which is of a type that does not have a decoder for reproducing DTS audio. However, it is also possible, for example, to apply the present invention to a DVD player which has a decoder for reproducing DTS audio, but which is so designed as not to output DTS audio because of the licensing issue regarding a DTS decoder.

Furthermore, according to the above embodiment, the compressed audio data of DTS audio is discriminated from the other compressed audio data in accordance with the stream ID 56 and the upper 5 bits of the substream ID 53 that are contained in the audio pack 50. However, it is also possible, for example, to perform the discrimination in accordance with other identification information contained in compressed audio data.

The present invention has been described above using presently preferred embodiments, but such description should not be interpreted as limiting the present invention. Various modification will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising:
   an optical pickup for reading out compressed data, including compressed video data and compressed audio data, recorded in a recorded area of an optical disc;
   a memory for storing a table of identification information for identifying kinds of the compressed data read out by the optical pickup;
   a demultiplexer for demultiplexing the compressed data, including compressed video data and compressed audio data, read out by the optical pickup into assorted kinds of data in accordance with the identification information stored in the memory;
   a video decoder for decoding the compressed video data demultiplexed by the demultiplexer;
   an audio decoder for decoding the compressed audio data demultiplexed by the demultiplexer;
   an output terminal for outputting the video data decoded by the video decoder and the audio data decoded by the audio decoder; and
   a main controller for controlling the optical pickup, the memory, the demultiplexer, the video decoder, the audio decoder and the output terminal, wherein
   the table of the identification information stored in the memory contains audio identification information for identifying kinds of compressed audio data,
   the audio decoder comprises plural kinds of audio decoders for respectively decoding plural kinds of compressed audio data read out by the optical pickup,
   selection out of the audio decoders is performed in a manner that the audio identification information contained in the compressed audio data which is read out by the optical pickup is compared with the audio identification information in the table of the identification information stored in the memory, thereby the kind of the compressed audio data read out by the optical pickup is discriminated, and one of the audio decoders is selected in accordance with the thus discriminated kind of compressed audio data,
   the audio decoder is absent of a DTS audio decoding function or DTS audio output function,
   the main controller performs such control that, in restarting a decoding process, compressed data of DTS audio is prevented from being sent to the audio decoder, thereby preventing the optical disc apparatus from becoming unable to output audio data from the output terminal,
   in stopping a preceding reproduction process, the memory stores audio identification information corresponding to the kind of audio having been reproduced in the preceding reproduction process, and
   in restarting the reproduction process, the demultiplexer is controlled by the main controller to extract, from the compressed audio data read out by the optical pickup, compressed audio data having the same audio identification information that the memory stores, and to send the extracted compressed audio data to the audio decoder.

2. The optical disc apparatus according to claim 1, wherein the audio identification information comprises an entirety of a stream identifier and a part of a substream identifier.

3. An optical disc apparatus comprising:
   an optical pickup for reading out compressed data, including compressed video data and compressed audio data, recorded in a recorded area of an optical disc;
   a memory for storing a table of identification information for identifying kinds of the compressed data read out by the optical pickup;
   a demultiplexer for demultiplexing the compressed data, including compressed video data and compressed audio data, read out by the optical pickup into assorted kinds of data in accordance with the identification information stored in the memory;
   a video decoder for decoding the compressed video data demultiplexed by the demultiplexer;
   an audio decoder for decoding the compressed audio data demultiplexed by the demultiplexer;
   an output terminal for outputting the video data decoded by the video decoder and the audio data decoded by the audio decoder; and
   a main controller for controlling the optical pickup, the memory, the demultiplexer, the video decoder, the audio decoder, and the output terminal, wherein the table of the identification information stored in the memory contains in-table audio identification information for identifying kinds of compressed audio data, the audio decoder comprises plural kinds of audio decoders for respectively decoding plural kinds of compressed audio data read out by the optical pickup, selection out of the audio decoders is performed in a manner that the audio identification information contained in the compressed audio data which is read out by the optical pickup is compared with the in-table audio identification information stored in the memory, thereby the kind of the compressed audio data read out by the optical pickup is discriminated, and one of the audio decoders is selected in accordance with the thus discriminated kind of compressed audio data, both the in-table audio identification information and the audio identification information contained in the compressed audio data which is read out by the optical pickup include stream ID and upper 5 bits of substream ID, the audio decoder is absent of a DTS audio decoding function or DTS audio output function, the optical disc apparatus has a resume function of restarting a reproduction process of the video and audio from the stop point at the time of stopping a preceding reproduction process, when the resume function is in an ON-state, in stopping the preceding reproduction process, the memory stores at-stop audio identification information corresponding to the kind of audio having been reproduced in the preceding reproduction process, when the resume function is in the ON-state, in restarting the reproduction process, the main controller compares the audio identification information, which is contained in the compressed audio data read out by the optical pickup, with the at-stop audio identification information, so as to control the demultiplexer to extract, from the compressed audio data read out by the optical pickup, compressed audio data having the same audio identification information as the at-stop audio identification information, and to send the extracted compressed audio data to the audio decoder, when the resume function is in an OFF-state, in restarting the reproduction process, the main controller compares the audio identification information, which is contained in the compressed audio data read out by the optical pickup, with audio identification information which corresponds to DTS audio and which is contained in the in-table audio identification information, so as to control the demultiplexer to extract, from the compressed audio data read out by the optical pickup, compressed audio data of kinds other than DTS audio, and to send the extracted compressed audio data to the audio decoder, and the main controller performs such control that, in restarting a decoding process, compressed data of DTS audio is prevented from being sent to the audio decoder, thereby preventing the optical disc apparatus from becoming unable to output audio data from the output terminal.

* * * * *